US 8,782,768 B2

(12) United States Patent
Larsson

(10) Patent No.: US 8,782,768 B2
(45) Date of Patent: Jul. 15, 2014

(54) SYSTEMS AND METHODS FOR ACCESSING A VIRTUAL DESKTOP

(75) Inventor: Per Olov Larsson, London (GB)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/524,412

(22) Filed: Jun. 15, 2012

(65) Prior Publication Data

US 2013/0340063 A1    Dec. 19, 2013

(51) Int. Cl.
*H04L 9/32* (2006.01)
*H04L 29/06* (2006.01)
*G06F 21/34* (2013.01)
*G06F 21/41* (2013.01)
*G06F 21/42* (2013.01)
*G06F 21/44* (2013.01)

(52) U.S. Cl.
CPC ............ *H04L 63/0815* (2013.01); *G06F 21/34* (2013.01); *G06F 21/41* (2013.01); *G06F 21/42* (2013.01); *G06F 21/44* (2013.01); *H04L 63/0807* (2013.01); *H04L 9/3247* (2013.01); *H04L 63/0272* (2013.01)
USPC .............. 726/9; 726/2; 726/4; 726/8; 726/10; 726/19; 726/20; 713/155; 713/156; 713/168; 713/172; 713/185

(58) Field of Classification Search
CPC ............ H04L 63/0815; H04L 63/0807; H04L 9/3247; H04L 63/0272; G06F 21/34; G06F 21/41; G06F 21/42; G06F 21/44
USPC .............. 726/2, 4, 15, 8–10, 19–30; 713/155; 713/156, 168, 172, 185, 186
See application file for complete search history.

(56) References Cited

U.S. PATENT DOCUMENTS

| 6,275,944 | B1 | 8/2001 | Kao et al. | |
|---|---|---|---|---|
| 7,793,101 | B2* | 9/2010 | Wipfel et al. | 713/168 |
| 2003/0110382 | A1* | 6/2003 | Leporini et al. | 713/172 |
| 2003/0115453 | A1* | 6/2003 | Grawrock | 713/155 |
| 2010/0299522 | A1* | 11/2010 | Khambete | 713/168 |
| 2011/0107409 | A1 | 5/2011 | Wilkinson et al. | |

(Continued)

FOREIGN PATENT DOCUMENTS

WO    WO 01/18635    3/2001

OTHER PUBLICATIONS

International Search Report and Written Opinion as received in International Patent Application No. PCT/US2013/045253, filed Jun. 11, 2013. Received Oct. 9, 2013. 15 pages.

(Continued)

*Primary Examiner* — Kambiz Zand
*Assistant Examiner* — Tongoc Tran

(57) ABSTRACT

Methods, computer-readable storage medium, and systems described herein facilitate enabling access to a virtual desktop of a host computing device. An authentication system receives one of an authentication token and a reference to the authentication token, wherein the authentication token is indicative of whether a user successfully logged in to an authentication portal using a client computing device. The authentication system generates a private key, a digital certificate, and a personal identification number (PIN) for the user in response to receiving the one of the authentication token and the reference to the authentication token. The private key, the digital certificate, and the PIN are stored in a virtual smartcard, and the client computing device is authorized to log into a virtual desktop using the virtual smartcard.

19 Claims, 3 Drawing Sheets

(56) References Cited

U.S. PATENT DOCUMENTS

| | | |
|---|---|---|
| 2012/0011578 A1 | 1/2012 | Hinton et al. |
| 2012/0017271 A1* | 1/2012 | Smith et al. ............... 726/19 |
| 2012/0084570 A1 | 4/2012 | Kuzin et al. |
| 2012/0096271 A1* | 4/2012 | Ramarathinam et al. ..... 713/172 |
| 2013/0013727 A1* | 1/2013 | Walker ................ 709/217 |
| 2013/0047214 A1* | 2/2013 | Radhakrishnan et al. ........ 726/4 |
| 2013/0047259 A1* | 2/2013 | Radhakrishnan et al. ...... 726/27 |
| 2013/0047266 A1* | 2/2013 | Radhakrishnan et al. ...... 726/28 |
| 2013/0061055 A1* | 3/2013 | Schibuk ................ 713/172 |

OTHER PUBLICATIONS

Basney et al. "The MyProxy Online Credential Repository". Software Practice & Experience, Wiley & Sons, Bognor Regis. vol. 25, No. 9. Published Jul. 25, 2005. pp. 801-816.

Melnikov et al. "Simple Authentication and Security Layer (SASL)". The Internet Society. Published Jan. 23, 2006. 32 pages.

Samar, Vipan. "Unified Login with Pluggable Authentication Modules (PAM)". Proceedings of the 3rd ACM Conference on Computer & Communications Security. New Dehli, India. Published Mar. 14, 1996. 10 pages.

* cited by examiner

SYSTEMS AND METHODS FOR ACCESSING A VIRTUAL DESKTOP

BACKGROUND

Virtual machines (VMs) may be executed by a group, or "cluster," of host computing devices. Each VM provides an abstraction of physical computing resources, such as a processor and memory, of the host executing the VM. The guest operating system and guest software applications executing within a VM may function in a manner consistent with how they would function when executing directly on physical resources.

A VM may provide a virtual desktop that is accessible by one or more remote users through a network. A virtual desktop is a virtual machine configured with a guest operating system and productivity software intended for interaction with an end user. Typically, each virtual desktop is configured as a standard physical desktop computer system that, along with productivity applications such as word processors, spreadsheets, email, etc., provide a rich user interface for interaction with a particular user—the user for whom the desktop is configured and to whom the desktop is assigned.

As with physical desktops, each virtual desktop may require a user to supply login credentials to enable the user to access the virtual desktop, however with virtual desktops, the user may be accessing their system remotely requiring the user to supply login credentials using a client computing device. As a plurality of virtual desktops may be accessible to the user, the user may be required to maintain different access credentials (e.g., a username and password) for each virtual desktop and may be required to enter the access credentials for each virtual desktop that the user desires to access. In addition, if the user's password expires for one or more virtual desktops, the user may not be able to log into the virtual desktops until the password is changed.

SUMMARY

Methods, computer-readable storage medium, and systems described herein facilitate enabling access to a virtual desktop of a host computing device. An authentication system receives one of an authentication token and a reference to the authentication token, wherein the authentication token is indicative of whether a user successfully logged into an authentication portal using a client computing device. The authentication system generates a private key, a digital certificate, and a personal identification number (PIN) for the user in response to receiving either the authentication token or the reference to the authentication token. The private key, the digital certificate, and the PIN are stored in a virtual smartcard, and the client computing device is authorized to log into a virtual desktop using the virtual smartcard.

DETAILED DESCRIPTION

Figure 1:
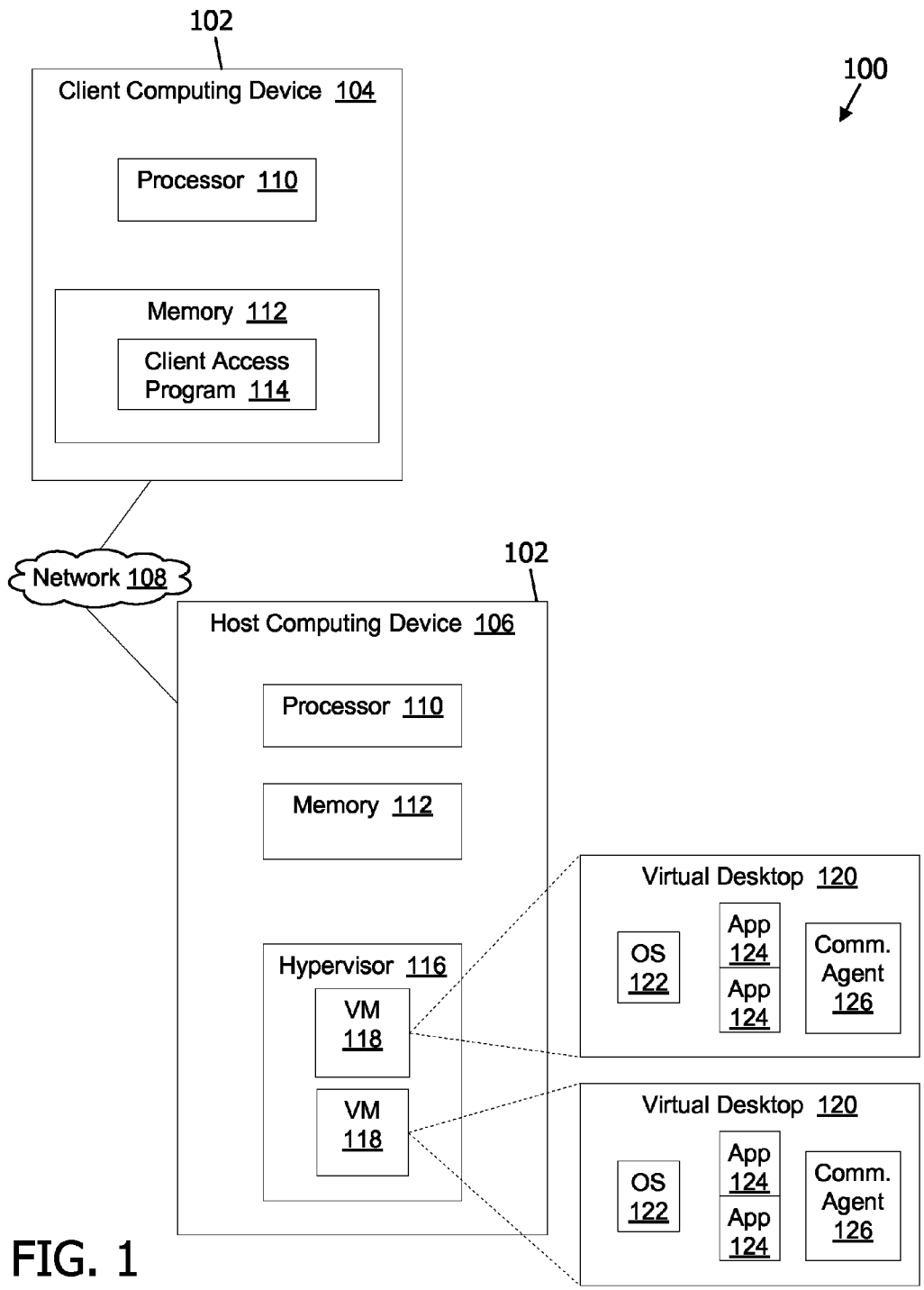
FIG. 1 is a block diagram of an exemplary system for accessing a virtual desktop of a computing device.

FIG. 1 is a block diagram of an exemplary system 100 for accessing a network resource, such as a remote or virtual desktop. System 100 includes a plurality of computing devices 102, such as a client computing device 104 (hereinafter referred to as "client 104") and a host computing device 106 (hereinafter referred to as "host 106") communicatively coupled to client 104 by a network 108. A user employs client 104 to access resources of host 106, as described more fully herein.

Each computing device 102 includes a processor 110 for executing instructions. Computing devices 102 may be heterogeneous and diverse. Client 104 may be, for example, a stateless or otherwise thin client, may be a tablet or mobile device, or an application running on a traditional computer system. Computer-executable instructions are stored in a memory 112 for performing one or more of the operations described herein. Memory 112 is any device allowing information, such as executable instructions, configuration options, and/or other data, to be stored and retrieved. For example, memory 112 includes one or more computer-readable storage media, such as one or more random access memory (RAM) modules, flash memory modules, hard disks, solid state disks, and/or optical disks.

Client 104 includes processor 110 and memory 112. In addition, client 104 includes a client access program 114 that is stored within memory 112 as a plurality of computer-readable instructions that are executable by processor 110. Client access program 114 is executed to enable the user to connect to host 106 and to access the resources of host 106. Client 104 may be a desktop computer, a server, a smart phone, a tablet computer, a thin client, or any other computing device that enables system 100 to function as described herein.

Host 106 includes processor 110 and memory 112. In addition, host 106 includes a virtualization software layer, such as a hypervisor 116, that is installed on a hardware platform of host 106, including processor 110 and memory 112. The virtualization software layer may supports a plurality of virtual machine execution spaces within each of which a virtual machines (VMs) 118 may be concurrently instantiated and executed. Hypervisor 116 maps physical resources of host 106 to virtual resources of each VM 118 and may enable each VM 118 to have dedicated execution space and resources.

In addition, VMs 118 may be configured as, or may include, virtual desktops 120 that each includes a guest operating system 122 and a plurality of guest applications 124. Users may "log in" to (i.e., be authenticated by) virtual desktop 120 and/or host 106 to access the resources of desktop 120, such as applications 124 and operating system 122. A communication agent 126 may be included within virtual desktop 120 to facilitate authentication and communication between client 104 and virtual desktop 120.

Figure 2:
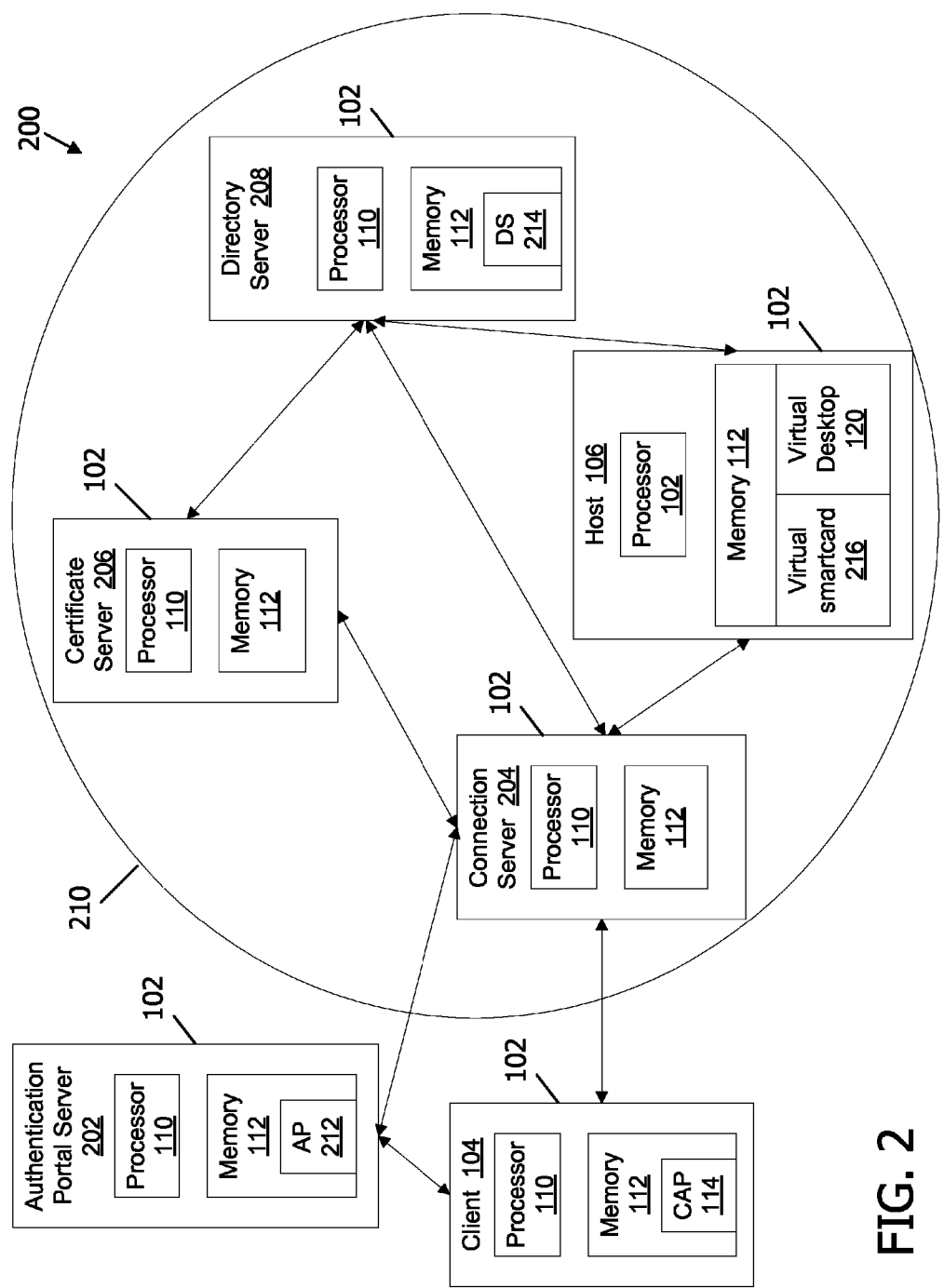
FIG. 2 is a block diagram of an exemplary authentication system that includes a plurality of computing devices.

FIG. 2 is a block diagram of an exemplary authentication system 200 that may be used to enable access to a virtual desktop 120 by a client 104. Authentication system 200 includes a plurality of computing devices 102, such as client 104, one or more hosts 106, an authentication portal server 202, a connection server 204, a certificate server 206, and a directory server 208. In an embodiment, connection server 204, certificate server 206, host 106, and directory server 208 are grouped within a domain 210. Although represented as being on corresponding physical devices 102, it should be recognized that the functionality of directory server 204, certificate server 206, and connection server 204 may be combined into a single server application or multiple server applications on a single physical system, or may reside on disparate virtual machines executing at arbitrary locations, on the same physical system or multiple different physical systems, or any combination of the above, within or accessible from, domain 210.

Computing devices 102 within domain 210 may require a user to undergo separate authentication processes to enable access to computing devices 102. Authentication system 200 facilitates enabling a single sign-on (SSO) of client 104 (i.e., the user of client 104) to computing devices 102 of domain 210 such that the user of client 104 may only be required to enter authentication credentials, such as a username and password, once to enable authentication and access computing devices 102 of domain 210.

Authentication portal server 202 is communicatively coupled to client 104 and to connection server 204. Authentication portal server 202 includes an authentication portal ("AP") 212 that is embodied as a plurality of computer-executable instructions stored within memory 112 and that is executed by processor 110 to perform the functions described herein. Authentication portal 212 operates as a trusted authority and facilitates establishing a level of trust within domain 210 for the user when the user is authenticated by authentication portal 212. In an embodiment, authentication portal 212 includes a VMware Horizon Program Manager program suite that is commercially available from VMware, Inc., of Palo Alto, Calif. Alternatively, authentication portal 212 may be any other portal or gateway that enables authentication system 200 to function as described herein.

Connection server 204 is communicatively coupled to client 104, authentication portal server 202, certificate server 206, host 106, and directory server 208. Connection server 204 facilitates the authentication of the user within domain 210, and specifically the authentication of the user with one or more virtual desktops 120, based on the trust level of the user that is established by authentication portal 212.

Certificate server 206 is communicatively coupled to connection server 204 and to directory server 208. Certificate server 206 generates and validates cryptographic digital certificates for use in authenticating the user to computing devices 102 within domain 210.

Directory server 208 is communicatively coupled to certificate server 206, connection server 204, and host 106. Directory server 208 includes a directory service ("DS") 214 that is embodied as a plurality of computer-executable instructions stored within memory 112 and that is executed by processor 110 to perform the functions described herein. In an embodiment, directory service 214 configures and manages user accounts and permissions within domain 210.

During operation, a user who desires to access a virtual desktop 120 first logs into authentication portal 212 by transmitting (via client 104) access credentials, such as a username and a password, to authentication portal 212. Authentication portal 212 authenticates the user by determining whether the access credentials are valid to enable access to portal 212. If the access credentials are valid, authentication portal 212 generates an authentication token indicative of the successful authentication. In an embodiment, the authentication token is a security assertion markup language (SAML) assertion that the user was authenticated by authentication portal 212.

The user, through client 104, requests access to virtual desktop 120 by transmitting a connection request to connection server 204. Connection server 204 verifies the user's access permissions with directory service 214, and uses the authentication token to determine whether the user is trusted. If the user is trusted, connection server 204 generates a private key, a digital certificate, and a personal identification number (PIN) for the user. In an embodiment, the private key, the digital certificate, and the PIN are "one-off" credentials that are only valid for a single connection session with the user. In addition, the PIN is a random number that is associated with the digital certificate, i.e., that is associated with an ability to perform cryptographic operations using the private key associated with the digital certificate. Alternatively, the PIN may include any other alphanumeric character, symbol, and/or entry that enables authentication system 200 to function as described herein. In an embodiment, connection server 204 stores the private key, the digital certificate, and the PIN in a virtual smartcard 216.

Virtual smartcard 216 is stored within host 106 and is communicatively coupled to, or stored within, the virtual desktop 120 that the user is requesting access to. Virtual smartcard 216 is a software-based representation of a physical smartcard or authentication device that stores credentials, such as a private key, a digital certificate, and optionally, a PIN. The credentials are used to authenticate the user associated with virtual smartcard 216 and to enable the user to access resources within domain 210 without having to enter a username and a password.

Client 104 connects to virtual desktop 120 and uses virtual smartcard 216 in lieu of providing access credentials, such as a username and password, to virtual desktop 120. Virtual desktop 120 authenticates the user via virtual smartcard 216 (e.g., using the private key, the digital certificate, and the PIN) with directory service 214 and certificate server 206. If the user is authenticated, the user is granted access to virtual desktop 120.

It should be understood that the user may access a plurality of virtual desktops 120, each having different access credential requirements, using virtual smartcard 216 and authentication system 200 while only being required to enter access credentials (e.g., the username and password) once at authentication portal 212. Accordingly, authentication system 200 enables users to access virtual desktops 120 and/or other resources within domain 210 even if the user does not know a password to virtual desktop 120 and/or the other resources. It should be understood that authentication system 200 may be used to enable a user to access resources other than virtual desktops, such as one or more physical computing devices 102, session-instances of one or more terminal servers, and/or applications executing on one or more computing devices 102, such as desktop computers and/or servers, while only being required to enter access credentials once at authentication portal 212.

Figure 3:
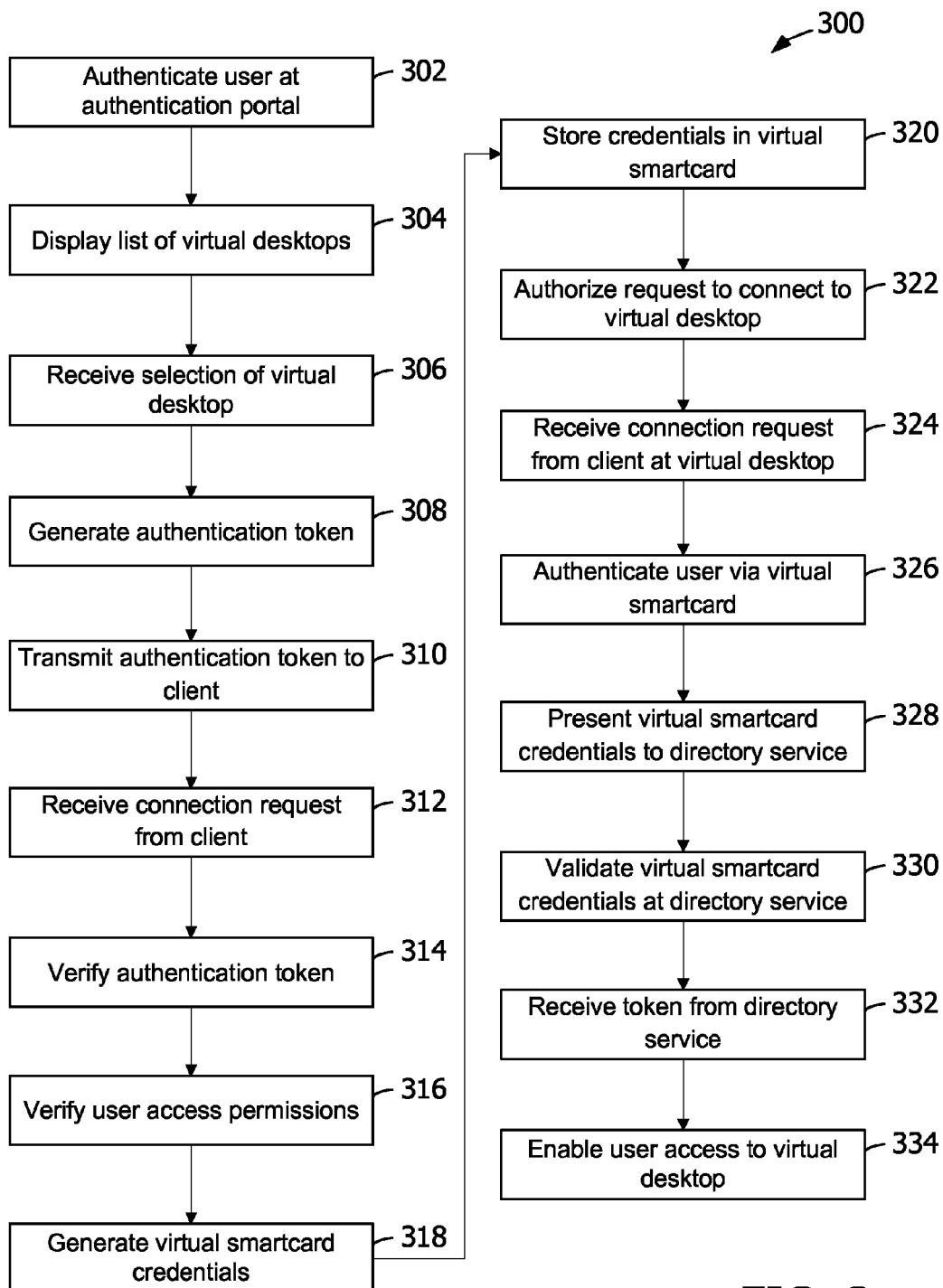
FIG. 3 is a flowchart of an exemplary method for accessing a virtual desktop that may be used with the authentication system shown in FIG. 2.

FIG. 3 is a flowchart of an exemplary method 300 of accessing a virtual desktop of a host computing device ("host") from a client computing device ("client"). Method 300 may be used with system 100 (shown in FIG. 1) and/or authentication system 200 (shown in FIG. 2). Method 300 is embodied within a plurality of computer-executable instructions stored in one or more memories, such as one or more computer-readable storage mediums. The instructions are executed by one or more processors to perform the functions described herein.

Method 300 is executed or performed by an authentication system to enable access from a user, via the client, to an access-protected virtual desktop within a host. In addition, method 300 enables single sign-on access to the virtual desktop, and to other access-protected virtual desktops and/or resources of the authentication system, during a connection session of the user.

The connection session of the user is initiated when the user connects to an authentication portal. Method 300 includes authenticating 302 the user at the authentication portal using access credentials supplied by the user via the client. The access credentials include, for example, a username and a password for the authentication portal. If the authentication portal determines that the access credentials are valid to enable access to the authentication portal, the portal displays 304 a list of virtual desktops that are accessible to the user based on user account settings and/or permissions, for example.

The authentication portal receives 306 a selection, from the client, of a virtual desktop that the user desires to access. A client access program may be executed within the client to facilitate communication and authentication to the virtual desktop. The authentication portal generates 308 an authentication token indicative of the successful authentication of the user and transmits 310 the authentication token to the client (e.g., to the client access program). In an embodiment, the authentication token is a SAML assertion that the user was authenticated by the authentication portal.

A connection server within the authentication system receives 312 a request (i.e., a connection request) from the client to connect to the selected virtual desktop. The connection request includes the authentication token, or a reference to the authentication token. The connection server verifies 314 the authentication token by transmitting the token (or reference) to the authentication portal. If the authentication token is valid, the connection server receives a confirmation of the token from the authentication portal. The confirmation verifies that the user is trusted by the authentication portal, and the connection server therefore trusts the user as well.

The connection server verifies 316 access permissions for the user, for example, by querying a directory service that contains user account permissions. If the user has sufficient permissions to access the virtual desktop, the connection server generates 318 credentials for a virtual smartcard. The virtual smartcard is used to facilitate SSO access to computing devices and/or virtual desktops that are otherwise access-restricted within a domain. The credentials for the virtual smartcard (also referred to as "smartcard credentials") include a private key, a digital certificate, and a personal identification number (PIN) for the user. The connection server stores 320 the smartcard credentials in the virtual smartcard, and associates the virtual smartcard with the virtual desktop that the user is attempting to connect to. For example, the virtual smartcard is stored within the host computing device of the virtual desktop and is communicatively coupled to the virtual desktop. Alternatively, the virtual smartcard is stored within the virtual desktop.

The connection server authorizes 322 the user's request to connect to the virtual desktop (i.e., the connection request received 312 above) to enable the user to send, via the client, a connection request to the virtual desktop. The virtual desktop receives 324 the connection request from the client. The connection request uses the smartcard credentials, rather than providing a username and password, to obtain access to the virtual desktop.

The virtual desktop authenticates 326 the user via the virtual smartcard credentials. As part of the authentication process, the virtual smartcard credentials are presented 328 to the directory service to log the user into the domain in which the virtual desktop resides. The virtual smartcard credentials are validated 330 by the directory service and the user logs into the domain. The virtual desktop receives 332 a token from the directory service that is representative of the identity and/or successful login of the user into the domain. The user is enabled 334 to access the virtual desktop and/or the resources contained therein. It should be recognized that the client and/or the authentication system may use the virtual smartcard to log into other virtual desktops in the domain without entering a username or a password to the virtual desktops.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An authentication system comprising:
   a plurality of access-protected network resources, each of the access-protected network resources having respective access permissions;
   a first computing device comprising a first processor configured to:
      receive an access request and access credentials from a first user;
      determine that the access credentials are valid; and
      in response to determining that the access credentials are valid, authenticate the first user and generate an authentication token for the first user; and
   a second computing device comprising a second processor configured to:
      receive a request from the first user to access a first access-protected network resource of the plurality of access-protected network resources;
      receive one of the authentication token for the first user or a reference to the authentication token;
      determine that the first user has permission to access the first access-protected network resource;
      generate smartcard credentials for the first user, wherein the smartcard credentials comprise a private key and a digital certificate with a public key for the first user;
      store the smartcard credentials in a virtual smartcard;
      associate the virtual smartcard with the first access-protected network resource to allow the first user to access the first access-protected network resource using the smartcard credentials without entering additional access credentials;
      receive a request from the first user to access a second access-protected network resource of the plurality of access-protected network resources, the second access-protected network resource having different access permissions from the first access-protected network resource;
      determine that the first user has permission to access the second access-protected network resource from one of the authentication token or a reference to the authentication token; and
      associate the virtual smartcard with the second access-protected network resource to allow the first user to access the second access-protected network resource using the smartcard credentials without entering additional access credentials, wherein:
         the plurality of access-protected network resources, the first computing device, and the second computing device are included within a domain.

2. The authentication system of claim 1, wherein the authentication token includes a security assertion markup language (SAML) assertion that the first user was authenticated.

3. The authentication system of claim 1, further comprising a directory service, wherein determining that the first user has permission to access the first access-protected network resource comprises transmitting a request to the directory service to validate whether the first user has permission to access the access-protected network resource.

4. The authentication system of claim 1, wherein the first processor is further configured to transmit, to the second computing device, the authentication token or the reference to the authentication token.

5. The authentication system of claim 1, wherein the second processor is further configured to validate the authentication token with an authentication portal.

6. The authentication system of claim 1, wherein the system further comprises a directory service included within the domain.

7. The authentication system of claim 6, wherein the second computing device is further configured to log the first user into the directory service using the virtual smartcard.

8. A non-transitory computer-readable storage medium having computer-executable instructions stored thereon that, when executed by one or more computing devices, cause the computing devices to perform operations comprising:
   receiving a request from a first user to access a first access-protected virtual desktop of a plurality of access-protected virtual desktops;
   receiving one of an authentication token or a reference to the authentication token, wherein the authentication token indicates that the first user successfully logged in to an authentication portal by submitting access credentials to the authentication portal;
   determining that the first user has permission to access the first access-protected virtual desktop;
   generating smartcard credentials for the first user, wherein the smartcard credentials comprise a private key, a digital certificate, and a personal identification number (PIN) for the first user;
   storing the smartcard credentials in a virtual smartcard;
   authorizing the client computing device to log into the first access-protected virtual desktop using the smartcard credentials stored in the virtual smartcard, without entering additional access credentials;
   receive a request from the first user to access a second access-protected network resource of the plurality of access-protected network resources, the second access-protected network resource having different access permissions from the first access-protected network resource;
   determine that the first user has permission to access the second access-protected network resource from one of the authentication token or a reference to the authentication token; and
   associate the virtual smartcard with the second access-protected network resource to allow the first user to access the second access-protected network resource using the smartcard credentials without entering additional access credentials, wherein:
      the plurality of access-protected network resources and the one or more devices are included within a domain.

9. The computer-readable storage medium of claim 8, wherein the computer-executable instructions further cause the at least one processor to transmit a request to a directory service to determine whether the first user has permission to access the first access-protected virtual desktop.

10. The computer-readable storage medium of claim 9, wherein the computer-executable instructions further cause the at least one processor to log the first user into the directory service using the virtual smartcard.

11. The computer-readable storage medium of claim 8, wherein the computer-executable instructions further cause the at least one processor to transmit a login request to the authentication portal, wherein the login request includes the access credentials associated with the user.

12. The computer-readable storage medium of claim 11, wherein the computer-executable instructions further cause the at least one processor to receive the authentication token or the reference to the authentication token from the authentication portal in response to the login request.

13. A method of authorizing a first user to access access-protected virtual desktops, the method comprising:
    receiving, by a first computing device, a request from the first user to access a first access-protected virtual desktop of a plurality of access-protected virtual desktops;
    receiving, by the first computing device, one of an authentication token or a reference to the authentication token, wherein the authentication token indicates that the first user successfully logged in to an authentication portal by submitting access credentials to the authentication portal;
    determining that the first user has permission to access the first access-protected virtual desktop;
    generating smartcard credentials for the first user, wherein the smartcard credentials comprise a private key, a digital certificate, and a personal identification number (PIN) for the first user;
    storing the smartcard credentials in a virtual smartcard; and
    associating the virtual smartcard with the first access-protected virtual desktop to allow the first user to log in to the first access-protected virtual desktop using the smartcard credentials without entering additional access credentials;
    receiving a request from the first user to access a second access-protected network resource of the plurality of access-protected network resources, the second access-protected network resource having different access permissions from the first access-protected network resource;
    determining that the first user has permission to access the second access-protected network resource from one of the authentication token or a reference to the authentication token; and
    associating the virtual smartcard with the second access-protected network resource to allow the first user to access the second access-protected network resource using the smartcard credentials without entering additional access credentials, wherein:
    the plurality of access-protected network resources and the first computing device are included within a domain.

14. The method of claim 13, wherein determining that the first user has permission to access the first access-protected virtual desktop further comprises transmitting a request to a directory service to validate whether the user has permission to access the first access-protected virtual desktop.

15. The method of claim 13, further comprising transmitting, by a second computing device, the access credentials to the authentication portal.

16. The method of claim 15, further comprising receiving, by the second computing device, the authentication token or the reference to the authentication token from the authentication portal.

17. The method of claim 16, further comprising transmitting, from the second computing device to the first computing device, the authentication token and the reference to the authentication token.

18. The method of claim 13, further comprising logging the first user into a directory service using the virtual smartcard.

19. The method of claim 18, further comprising logging the user into the domain such that the first user is enabled to log into the plurality of access-protected virtual desktops within the domain using the smartcard credentials.

* * * * *